Aug. 6, 1940.                J. F. CAVANAGH                2,210,165
                          FASTENER-APPLYING IMPLEMENT
                            Filed Feb. 24, 1939            3 Sheets-Sheet 1

Inventor:
John F. Cavanagh
By
Attorneys.

Aug. 6, 1940.   J. F. CAVANAGH   2,210,165
FASTENER-APPLYING IMPLEMENT
Filed Feb. 24, 1939   3 Sheets-Sheet 2

Inventor:
John F. Cavanagh
By
Attorneys.

Aug. 6, 1940.   J. F. CAVANAGH   2,210,165
FASTENER-APPLYING IMPLEMENT
Filed Feb. 24, 1939   3 Sheets-Sheet 3

Inventor:
John F. Cavanagh
By Arrington and White
Attorneys

Patented Aug. 6, 1940

2,210,165

UNITED STATES PATENT OFFICE 2,210,165

FASTENER-APPLYING IMPLEMENT

John F. Cavanagh, Providence, R. I., assignor to Boston Wire Stitcher Company, Warwick, R. I., a corporation of Maine Application February 24, 1939, Serial No. 258,214

18 Claims. (Cl. 1—3)

The present invention relates to improvements in fastener-applying implements adapted for attaching papers and other sheets, securing tags and labels to articles of commerce and for use generally in fastening or stitching together various objects and articles.

One of the objects of the present invention is to provide an implement of the type indicated which may be selectively adjusted during the driving of a fastener to clinch the fastener by one or the other of several methods.

Another object of the invention is to provide an implement of the type indicated having a movable anvil with separate sets of clinching means adapted to be selectively operated by the fastener-applying means during the driving of a fastener to aline the latter with a particular set of the clinching means.

Another object of the invention is to provide an implement of the type indicated having a tiltable presser knob for actuating the fastener-applying means and controlling the relative adjustment of the fastener-applying means and anvil.

Another object of the invention is to provide an implement of the type indicated which is of relatively simple construction to adapt it for economical manufacture and positive in its operation to relatively adjust the fastener-applying means and anvil to aline the fastener being driven with a particular set of clinching means.

Further objects of the invention are set forth in the following specification which describes one form of construction of the implement, by way of example, and a modification thereof, as illustrated by the accompanying drawings. In the drawings.

Figure 1:
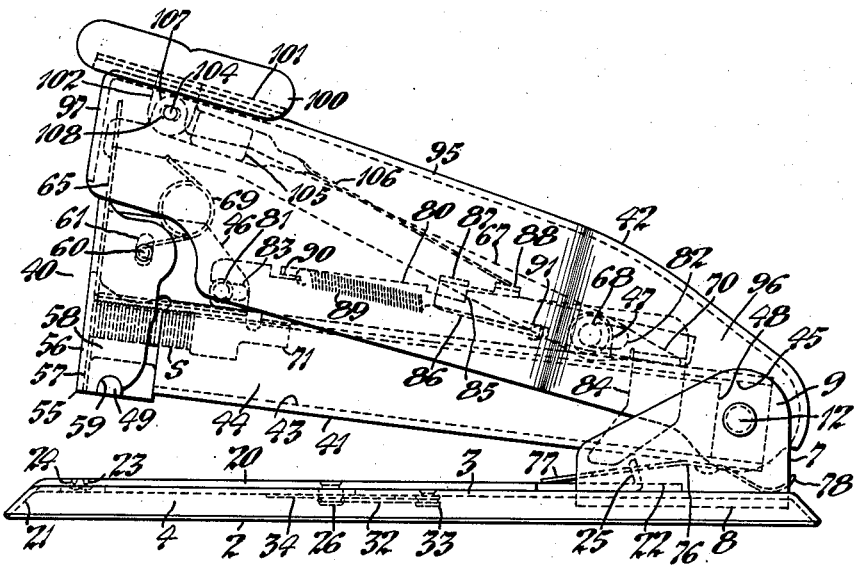
Fig. 1 is a side elevational view of a fastener-applying implement incorporating the novel features of the present invention.

The present invention, in general, relates to a fastener-applying implement having a base and a fastener-applying arm pivotally mounted thereon. An anvil having a plurality of sets of clinching means spaced apart longitudinally thereon is movably mounted on the base and a slide having a depending portion interlocking with the anvil is mounted on the fastener-applying arm. The anvil is yieldingly held in position on the base to normally aline one of the sets of clinching means with the fastener being driven. Selective means in the form of a tiltable presser knob on the fastener-applying arm is operable during the driving of a fastener to either lock the slide to the fastener-applying arm or to release it for sliding movement thereon. With the tiltable knob rocked to position to release the slide the longitudinal component of the arcuate movement of the fastener-applying arm toward the base is translated into a sliding movement of the slide on the arm. However, when the tiltable knob is rocked to lock the slide to the fastener-applying arm the longitudinal component of the arcuate movement of the latter is translated through the interlocking means on the slide and anvil into a sliding movement of the latter to aline a different set of clinching means with the fastener being driven.

In the accompanying drawings the invention is illustrated as applied to an implement for driving and clinching U-shaped staples, but it is to be understood that it is adapted for use with various devices for driving and clinching other forms of fasteners. As herein illustrated, the implement comprises a rectangular base 2 having a top plate 3 and a depending marginal flange 4. The top plate 3 and depending flange 4 of the base 2 are cut away at the forward end to provide a recess 5 therein, see Fig. 6, and adjacent the rearward end of the base the top plate 3 is provided with a pair of spaced slots 6. A U-shaped bracket 7 is mounted on the base 2 with its web portion 8 in abutting engagement with the bottom face of the top plate 3 and its side flanges projecting upwardly through the slots 6 to provide spaced ears 9. As herein illustrated the bracket 7 is attached to the base 2 by means of a rivet 10 extending through its web portion 8 and the top plate 3, but it may be secured in place by any other suitable means such as welding or the like. The upwardly-extending ears 9 on the bracket 7 are pierced with alined holes for receiving the opposite ends of a pivot pin 12.

Figure 8:
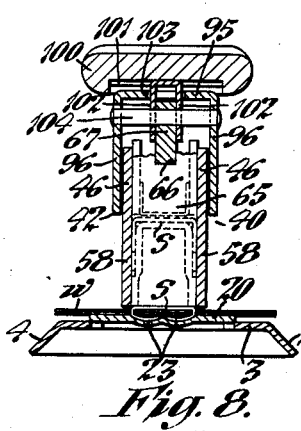
Fig. 8 is a transverse sectional view taken on line 8—8 of Fig. 2 showing the legs of a driven staple clinched inwardly toward each other by the rearward set of clinching means to form a permanent stitch.
Figure 9:
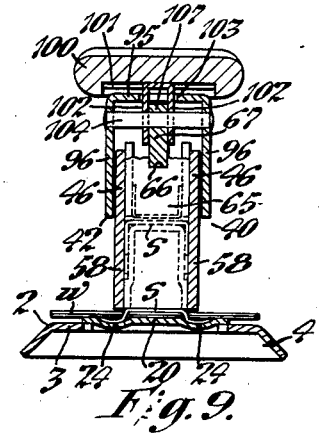
Fig. 9 is a transverse sectional view taken on line 9—9 of Fig. 4 showing the legs of a driven staple clinched outwardly away from each other by the forward set of clinching means to form a temporary stitch.

In accordance with the present invention an anvil-plate 20 is mounted on the top plate 3 of the base 2 to slide longitudinally thereof. The anvil-plate 20 is of generally rectangular form having a depending beveled lip 21 at its forward end extending into the recess 5 in the base 2 and a reduced portion 22 at its rearward end adapted to fit closely between the spaced ears 9, the side edges of the recess and the inside faces of the ears serving to guide the anvil-plate during its sliding movement on the base. Adjacent its forward end the anvil-plate 20 is provided with separate sets of clincher-grooves 23 and 24 formed therein and arranged in longitudinally-spaced relationship. The clincher-grooves 23 are adapted to deflect the legs of a staple inwardly toward each other to form a permanent stitch as illustrated in Fig. 8; while the clincher-grooves 24 are adapted to deflect the legs of the staple outwardly away from each other to form a temporary or pin-stitch as shown in Fig. 9. The anvil-plate 20 is provided with an upstanding flange 25 adjacent its rearward end for a purpose explained more fully hereinafter.

Figure 4:
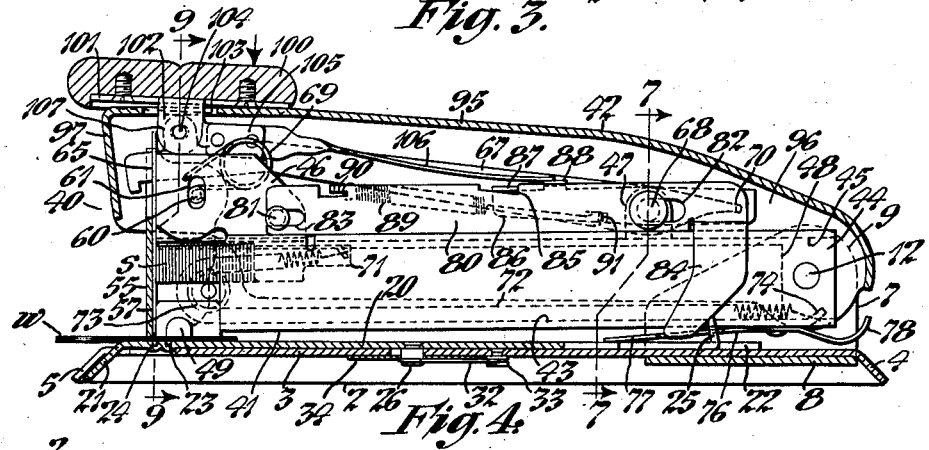
Fig. 4 is a longitudinal sectional view similar to Fig. 3 showing the anvil slid to its rearward position by the fastener-applying means to aline the fastener being driven with the forward set of clinching means.

Intermediate the ends of the anvil-plate 20 is a depending stud 26 which projects downwardly through an opening 27 in the top plate 3 of the base 2. As shown most clearly in Fig. 6, the opening 27 in the top plate 3 of the base 2 extends between the adjacent edges 28 and 29 of spaced tongues 30 and 31 which are engaged by the depending stud 26 to limit the sliding movement of the anvil-plate 20. Preferably, the tongues 30 and 31 are formed in the top plate 3 of the base 2 by punching out an E-shaped piece. The tongues 30 and 31 may be bent either forwardly or rearwardly by any suitable tool to initially adjust the relationship of the anvil-plate 20 with respect to the base 2. The anvil-plate 20 is yieldingly held in its forward position of adjustment by means of an S-shaped spring 32 tensioned between the depending stud 26 and a stud 33 secured on the under side of the top plate 3 of the base 2. Preferably, a cover-plate 34 is provided between the spring 32 and the bottom of the top plate 3 of the base 2 as shown in Fig. 4 and indicated by dash lines in Fig. 6.

The stapling arm 40 comprises a staple-magazine 41 and an operating lever 42 constituting a cover in which the magazine is adapted to be nested, the magazine and lever being mounted to rock on the common pivot-pin 12. The magazine 41 is of channel-shape in cross-section, comprising a bottom wall 43 and upwardly-extending side walls 44 folded inwardly at their upper edges to provide retaining flanges 45 for the staples s. The rearward end of the magazine 41 is positioned between the ears 9 on the base 2 and its side walls 44 are pierced to provide alined holes through which the pivot-pin 12 extends. Adjacent the forward end of the magazine 41 the side walls 44 extend upwardly and forwardly to provide overhanging stanchions 46; while adjacent its rearward end are ears 47 folded upwardly from the retaining flanges 45. Rails 48 are mounted on the bottom wall 43 of the magazine 41 in spaced relation to its side walls 44 to provide a core for supporting U-shaped staples s straddled thereacross. The rails 48 forming the core project forwardly beyond the magazine 41 to underlie the overhanging stanchions 46 and are provided with latching lugs 49 adjacent their lower edges.

The forward end of the magazine 41 is closed by a U-shaped gate 55 having a front wall 56 which cooperates with the end of the core to provide a throat 57 therebetween and side walls 58 which overlie the sides of the core with notches 59 formed therein for cooperation with the latching lugs 49. The gate 55 is pivotally mounted on the magazine 41 by means of a pin 60 which extends transversely through alined holes in its side walls 58 and oval slots 61 in the stanchions 46. Thus the gate 55 may pivot on the pin 60 to open the magazine but is normally held in its closed position by the engagement of the notches 59 in its side walls 58 with the latching lugs 49 on the forwardly-projecting ends of the rails 48.

A blade-like staple-driver 65 mounted to reciprocate in the throat 57 has a slotted opening 66 adjacent its upper end. An actuating lever 67 for the staple-driver 65 is pivotally mounted adjacent its rearward end on a pin 68 extending between the upwardly-extending ears 47 on the magazine 41. The lever 67 is normally inclined upwardly from its pivot with its forward end projecting through the slotted opening 66 in the staple-driver 65. A coiled hairpin spring 69 acting between the pivot-pin 60 for the gate 55 and the bottom side of the lever 67 yieldingly holds the latter in its raised position with the driver 65 raised above the end of the staple-core, the upward movement of the lever being limited by the engagement of its curved rearward end 70 with the top of the magazine 41. The spring 69 also functions to maintain the gate 55 closed against the end of the magazine. A pusher 71 is mounted in straddled relationship on the rails 48 of the staple-core and is adapted to be yieldingly advanced to feed the staples s into the throat 57 by means of a coiled spring 72, see Fig. 4. The spring 72 has one end attached to the pusher 71 and extends forwardly between the rails 48, being looped around a transverse stud 73 supported between the rails and then rearwardly with its opposite end attached to a lug 74 on the bottom wall 43 of the magazine 41. A leaf-spring 76 attached to the bottom wall 43 of the magazine 41 at its rearward end has a forwardly-extending portion 77 engaging the base 2 to yieldingly hold the fastener-applying arm 40 raised with respect to the base; a curved tail-portion 78 at the rearward end of the spring being adapted to engage the base to limit the upward movement of the arm.

A slide 80 mounted on the magazine 41 is of generally rectangular form with slots 82 and 83 adjacent its opposite ends. The rearward end of the slide 80 is mounted on the end of the pivot-pin 68 and its forward end on a stud 81 supported by the stanchions 46, the pin and stud being engaged in the slots 82 and 83 in the slide. Thus the slide 80 is free to move longitudinally of the magazine 41, being guided by the stud 81 and pivot-pin 68 on which it is mounted. An arm 84 depends from the slide 80 at its rearward end and is arranged for engagement with the upwardly-extending flange 25 on the sliding anvil 20. The upper edge of the slide 80 is recessed intermediate its ends to provide a locking shoulder 85.

Figure 5:
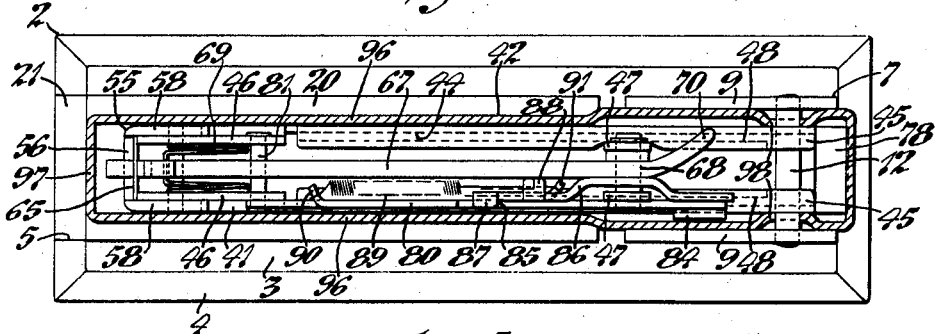
Fig. 5 is a part-sectional plan view of the implement showing the relationship of its parts.
Figure 7:
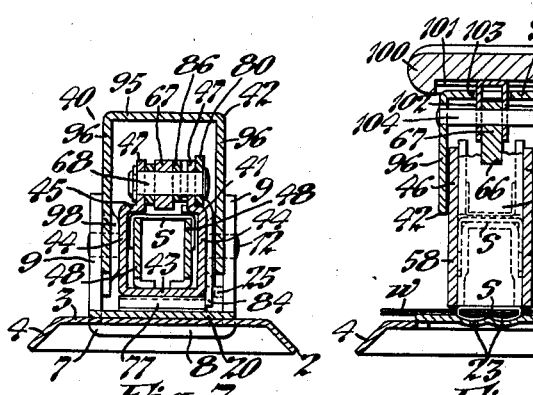
Fig. 7 is a transverse sectional view taken on line 7—7 of Fig. 4 showing the magazine construction.

At the side of the slide 80 is a locking lever 86 pivotally mounted on the pivot-pin 68 between the actuating lever 67 and the ear 47, see Figs. 5 and 7. As herein illustrated the pin 68 extends through a central bearing portion of the lever 86 which abuts the side of the lever 67 while the offset end portions of the lever 86 bear against the inside face of the slide 80. The forward end portion of the locking lever 86 has an outwardly-extending lateral lug 87 overlying the top edge of the slide 80 and an inwardly-extending lug 88 projecting between its end portion and the actuating lever 67. A helical spring 89 is connected between an ear 90 at the upper edge of the slide 80 and an ear 91 at the lower edge of the locking lever 86. Thus the spring 89 normally functions to yieldingly retain the slide 80 retracted to its rearward position and the locking lever 86 rocked to its inoperative position as illustrated in Fig. 1. The spring 89 has considerably less resistance than the spring 32, previously described, to adapt the slide 80 to normally move with respect to the anvil 20. The locking lever 86, however, is adapted to be rocked to engage its lug 87 with the locking shoulder 85 on the slide 80 to hold the latter against movement relatively of the anvil 20.

The operating lever 42 is of inverted channel-shape in cross-section having a top wall 95, depending side walls 96 adapted to embrace the sides of the magazine 41 and a front wall 97 adapted to overhang the forward end of the magazine. As illustrated in Fig. 5, the rearward portions of the side walls 96 are offset outwardly to adapt them to fit closely between the upstanding ears 9 on the base 2 and are provided with inwardly-projecting bosses 98 engaging the sides of the magazine to hold it centrally thereof. The bosses 98 are pierced with alined holes through which the pin 12 extends to pivotally mount the lever 42 on the base 2.

In accordance with the present invention a selective control element is mounted on the stapling arm 40 to adapt it to effect relative adjustment between the arm and the slidable anvil 20 to aline a staple being driven with a particular set of the clincher-grooves 23 or 24. In the herein illustrated embodiment of the invention the selective control element is in the form of a presser knob 100 rockably mounted on the lever 42 adjacent its forward end. The knob 100 has a plate 101 attached to its bottom with ears 102 extending at right-angles thereto. The ears 102 project downwardly through an opening 103 in the top wall 95 of the lever 42 and are pierced with alined holes adjacent their free ends. By this means the knob 100 is pivotally mounted on a pin 104 extending between the side walls 96 of the lever 42 and through the alined holes in the ears 102. The ears 102 are of such length with respect to the pivot-pin 104 as to adapt the knob 100 forwardly of the pivot-pin 104 to operFig. 2 to that illustrated in Fig. 3, and vice versa. One of the ears 102 has a rearward extension 105 with a rearwardly-extending control arm 106 attached thereto. The rearward or free end of the control arm 106 overlies the inwardly-extending lateral lug 88 on the locking lever 86. Thus, when manual pressure is applied to the knob 100 forwardy of the pivot-pin 104 to operate the implement the knob and attached control arm 106 will be rocked on its pivot to position the free end of the control arm above the lug 88 on the locking lever 86. The slide 80 is then free to move longitudinally of the magazine 41. On the other hand, when pressure is applied on the knob 100 rearwardly of its pivot the rocking movement of the knob will cause the free end of the control arm 106 to engage the lug 88 on the locking lever 86 and rock the latter to engage its outwardly-projecting lug 87 with the locking shoulder 85 on the slide 80. An upstanding ear 107 at the forward end of the actuating lever 67 is positioned between the depending ears 102 on the knob 100 and has a slot 108 therein through which the pivot-pin 104 extends, thus connecting the knob with the lever for actuating the driver 65. One embodiment of the invention having now been described in detail its mode of operation is explained as follows:

The implement is prepared for operation by swinging the gate 55 on its pivot-pin 60 to open the forward end of the magazine 41. A supply of staples s, preferably in "stick" form, is inserted into the magazine 41 by sliding them rearwardly against the action of the pusher 71. The gate 55 is then swung to its closed position to cooperate with the end of the rails 48 to form the throat 57 through which the staples s are driven. The work w to be stapled is placed on the anvil 20 and manual pressure applied to the knob 100 to rock the stapling arm 40 toward the base 2. The forward end of the magazine 41 first engages the work w to clamp it against the anvil 20 and continued pressure on the knob 100 causes the lever 42 to move relatively of the magazine. The actuating lever 67 for the staple-driver 65, being connected to the operating lever 42 and knob 100 by the pin 104, is rocked on its pivot-pin 68 to thereby actuate the driver to drive a staple s fed forwardly from the magazine 41. When the operating lever 42 is released the spring 69 acting between the actuating lever 67 and stapling arm 40 and the spring 76 acting between the stapling arm and base 2 cause the parts to be returned to their inoperative position illustrated in Fig. 1. The spring 72 then acts on the pusher 71 to advance the staples in the magazine 41 to again position the foremost staple s in the throat 57 beneath the staple-driver 65.

Figure 2:
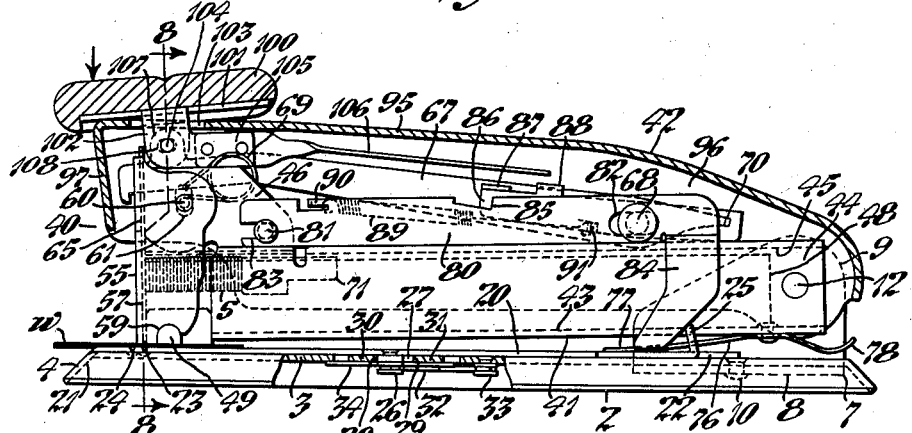
Fig. 2 is a longitudinal sectional view of the implement showing the control knob on the fastener-applying arm tilted to one of its positions to adjust the device to cause a fastener being driven to be clinched by the rearward set of clinching means.
Figure 6:
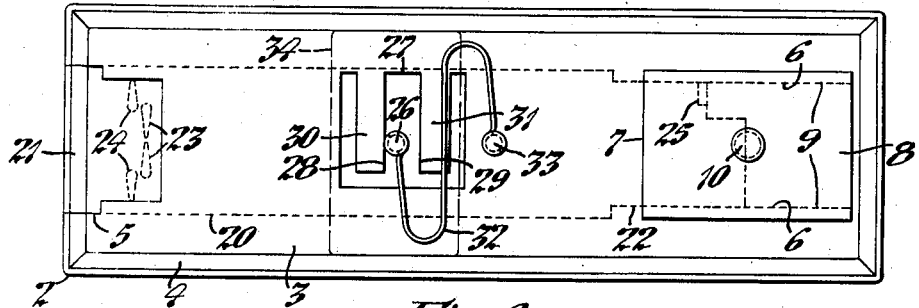
Fig. 6 is a bottom plan view of the base of the implement showing the spring for yieldingly holding the anvil in one of its positions of adjustment on the base.

The S-shaped spring 32 tensioned between the stud 33 on the base 2 and the stud 26 on the sliding anvil 20 yieldingly holds the stud 26 in engagement with the tongue 30, see Fig. 6, to normally aline the rearward set of clincher-grooves 23 with the staple s being driven. The anvil 20 is initially adjusted to insure proper registry of its clincher-grooves with the staple-driver by bending the tongue 30 either forwardly or rearwardly. When a permanent stitch is desired the operator applies pressure to the knob 100 on the lever 42 forwardly of the pivot-pin 104. The knob 100 is thus rocked in the pivot-pin 104 to raise the control arm 106 above and out of engagement with the locking lever 86. The locking lever 86, being under the influence of the spring 89 is then rocked on its pivot-pin 68 in a clockwise direction as viewed in Fig. 2 to hold its outwardly-projecting lateral lug 87 in raised position above the slide 80.

As the magazine 41 and slide 80 mounted thereon rock on the pivot-pin 12 toward the base 2 the lower end of the depending arm 84 on the slide 80 tends to move downwardly and rearwardly in an arc about the pivot-pin 12. The depending arm 84 on the slide 80 will thus be engaged with the upstanding flange 25 on the anvil 20, and due to the greater resistance of the spring 32 for holding the anvil than the spring 89 for holding the slide, the latter will slide longitudinally of the stapling arm 40. Thus the sliding anvil 20 is yieldingly held in position on the base 2 to aline the rearward set of clincher-grooves 23 with the driven staple s. As the legs of the driven staple s penetrate the work w they are automatically folded inwardly toward each other to form a permanent stitch as illustrated in Fig. 8.

Figure 3:
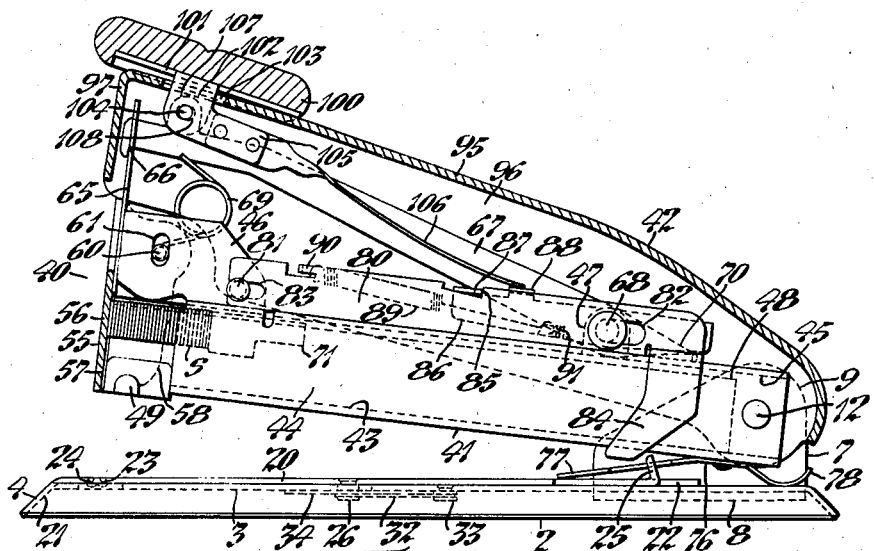
Fig. 3 is a longitudinal sectional view of the implement showing the control knob tilted to another of its positions to adjust the device to cause the fasteners to be clinched by the forward clinching means.

If a temporary stitch is desired the operator applies manual pressure on the control knob 100 rearwardly of its pivot which causes the knob and control arm 106 attached thereto to rock in a clockwise direction from the position shown in Fig. 1 to that in Fig. 3. The rearward free end of the control arm 106 will thus be engaged with the inwardly-projecting lateral lug 88 on the locking lever 86 to rock the latter in a counterclockwise direction about its pivot-pin 68 from the position illustrated in Fig. 1 to that illustrated in Fig. 3 thereby causing its outwardly-projecting lug 87 to engage with the locking shoulder 85 on the slide 80. The slide 80 is then positively locked to the magazine 41 so that it cannot move longitudinally thereof. During the rocking movement of the stapling arm 40 toward the base 2 the depending arm 84 on the slide 80 is moved downwardly and rearwardly into engagement with the upstanding flange 25 on the sliding anvil 20 and consequently the longitudinal component of movement of the arm 84 is translated into longitudinal sliding movement of the anvil on the base 2. Thus, the anvil 20 is slid rearwardly as the stapling arm rocks toward the base with the S-shaped spring 32 yielding to permit such movement.

The separate sets of clincher-grooves 23 and 24 are spaced apart longitudinally of the anvil 20 a distance equal to the longitudinal component of arcuate movement of the lower end of the depending arm 84 on the slide 80 so that the forward set of clincher-grooves 24 are brought into alinement with the driven staple s. When the stapling arm 40 is released the magazine 41 and operating lever 42 are returned to their inoperative position in the manner as explained above and the S-shaped spring 32 slides the anvil 20 forwardly until the depending stud 26 engages the tongue 30 to aline the rearward set of clincher-grooves 23 with the driven staple. Thus, when the control knob 100 is tilted forwardly the anvil 20 is held in fixed position on the base 2 to aline the fastener being driven with the rearward set of clincher-grooves 23 and the slide 80 moves longitudinally of the stapling arm 40; and when the control knob is tilted rearwardly the slide 80 is locked to the stapling arm 40 and the anvil 20 is slid rearwardly on the base 2 to aline the forward set of clincher-grooves 24 with the driven staple.

Figure 10:
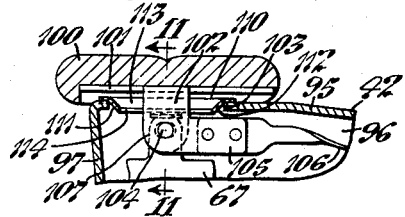
Fig. 10 is a partial longitudinal sectional view of the operating lever illustrating a modied form of construction including a locking element for retaining the tiltable control knob in either of its positions of adjustment.
Figure 12:
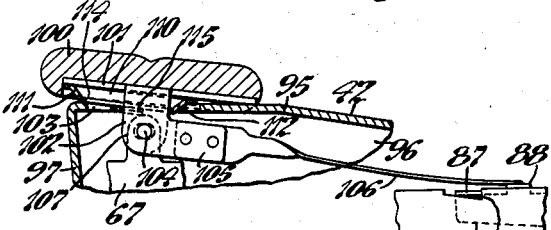
Fig. 12 is a view similar to Fig. 10 showing the locking element slid forwardly on the operating lever to lock the control knob in one of its operative positions.
Figure 11:
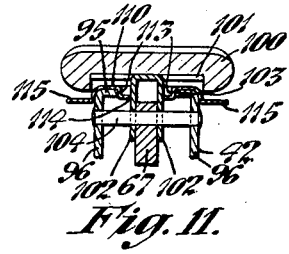
Fig. 11 is a transverse sectional view of the same taken on line 11—11 of Fig. 10 showing the laterally-extending finger-pieces on the locking element for sliding it relatively of the knob.

In Figs. 10 to 12 a modified form of construction is illustrated as incorporating a locking element 110 on the fastener-applying arm adapted to lock the tiltable knob 100 in either of its two positions of adjustment. In this latter form of construction the knob 100 is of identical construction with that illustrated in Figs. 1 to 9 and is mounted on the fastener-applying lever 42 in the same way. The opening 103 in the top wall 95 of the operating lever 42, however, is made longer and wider to receive the locking element 110. The locking element 110 is in the form of a plate having its central portion depressed to provide forward and rearward inclined cam-faces 111 and 112 and side flanges 113. An opening 114 is provided in the depressed central portion of the element 110 through which the depending ears 102 on the knob 100 project. The depressed portion of the locking plate 110 extends into the opening 103 in the operating lever 42 to adapt the marginal portion of the plate to seat on the top wall 95 of the lever, see Fig. 10. As illustrated in Fig. 11, finger-pieces 115 project laterally from the locking plate 110 to adapt the latter to be gripped manually and slid forwardly or rearwardly.

With the locking element 110 in the neutral position illustrated in Fig. 10 the knob 100 may be tilted either forwardly or rearwardly during the operation of the implement to aline the staple being driven with either the forward or rearward set of clincher-grooves 23 or 24 on the anvil 20. If the operator desires to continuously clinch each staple to form a temporary stitch the locking element 110 is slid forwardly to the position illustrated in Fig. 12 by means of the finger-pieces 115. As the locking element 110 is slid forwardly its forward cam-face 111 will engage the forward edge of the opening 103 in the top wall 95 of the lever 42 and rock the element to tilt the knob 100 rearwardly. When the locking element is slid to its forward position its bottom edge will seat on the top wall 95 to hold the knob 100 in its rearwardly tilted position. The slide 80 will be then permanently locked to the magazine 41 to cause the anvil 20 to be slid rearwardly on the base 2 each time the fastener-applying arm 40 is rocked toward the base 2 whereof to aline the staple being driven with the forward set of clinching grooves 24.

If, on the other hand, the operator desires to continuously clinch each staple to form a permanent stitch the locking element 110 is slid rearwardly and due to the engagement of its rearward cam-face 112 with the rearward edge of the opening 103 in the lever 42 the knob 100 will be tilted forwardly and held in this position of adjustment. Thus the slide 80 will be free to slide with respect to the magazine 41 and the staples being driven will be operated upon by the rearward set of clinching grooves 23.

It will be observed from the foregoing description that the present invention provides for selective operation of the implement to clinch the fasteners by different methods. It will be observed also that the selective adjusting means is controlled from the fastener-applying means and operated by the force applied to drive the fasteners. Further, it will be observed that the implement is of relatively simple construction and positive in its operation to selectively control the type of stitch to be formed.

While the device is herein illustrated and described as embodied in a preferred form of construction, it is to be understood that modifications may be made in the structure and arrangement of its parts without departing from the spirit or scope of the invention. Therefore, without limiting myself in this respect, I claim:

1. In a device of the type indicated, a plurality of sets of clinching means, fastener-applying means relatively movable toward and away from said clinching means, means for relatively adjusting the clinching means and fastener-applying means to aline the latter with any one of the sets of clinching means, and a tiltable knob for operating the fastener-applying means and controlling the operation of the adjusting means.

2. In a device of the type indicated, an anvil having a plurality of sets of clinching means, fastener-applying means mounted for movement toward and away from the anvil, means for relatively adjusting the anvil and fastener-applying means to aline a fastener being driven with a particular predetermined set of the clinching means on the anvil, and means for operating the fastener-applying means and controlling the operation of said adjusting means.

3. In a device of the type indicated, an anvil having a plurality of sets of clinching means, fastener-applying means mounted for movement toward and away from the anvil, said fastener-applying means being adapted to cooperate with one set of the clinching means on the anvil, means for relatively adjusting the anvil and fastener-applying means to aline the latter with another set of the clinching means on the anvil, and selectively operable means on the fastener-applying means for controlling the operation of said last-named means.

4. In a device of the type indicated, an anvil having a plurality of sets of clinching means, fastener-applying means mounted for movement toward and away from the anvil, a tiltable knob for operating the fastener-applying means, and means operable during the driving of a fastener for relatively adjusting the fastener-applying means and anvil to aline the fastener being driven with a particular set of clinching means, the operation of the last-named means being controlled by the tiltable knob for the fastener-applying means.

5. In a device of the type indicated, an anvil having a plurality of sets of clinching means, fastener-applying means mounted for movement toward and away from the anvil, a tiltable knob for operating the fastener-applying means, said fastener-applying means being adapted to cooperate with one set of the clinching means, means for relatively adjusting the anvil and fastener-applying means to adapt the latter to cooperate with another set of the clinching means, and means operated by the tiltable knob for controlling the operation of said adjusting means.

6. In a device of the type indicated, a base, an anvil mounted for movement relatively of the base and having a plurality of sets of clinching means, fastener-applying means mounted for movement toward and away from the anvil, said fastener-applying means normally cooperating with one set of the clinching means, and means on the fastener-applying means selectively operable to move the anvil relatively of the base during the movement of the fastener-applying means toward the latter to aline a fastener being driven with another set of the clinching means.

7. In a device of the type indicated, a base, an anvil slidable on said base and having a plurality of sets of clinching means, fastener-applying means mounted for movement toward and away from the anvil, a slide on the fastener-applying means, interengaging means on the anvil and slide, and means selectively operable to engage the slide with the fastener-applying means or to release it from engagement therewith.

8. In a device of the type indicated, a base, an anvil movable on said base and having a plurality of sets of clinching means, fastener-applying means mounted for movement toward and away from the anvil, a slide on the fastener-applying means, interengageable means on the anvil and slide, and means selectively operable to lock the slide to the fastener-applying means during the movement of the latter to apply a fastener whereby the slide will act to move the anvil on the base to aline the fastener being driven with a particular set of clinching means.

9. In a device of the type indicated, a base, an anvil mounted to slide on the base and having a plurality of sets of clinching means, a fastener-applying arm pivotally mounted for rocking movement toward and away from the anvil, yielding means for holding the anvil in predetermined position on the base to aline one of the sets of clinching means with the fastener-applying means, a slide on the fastener-applying arm, interengaging means on the slide and anvil, and selectively operable means for locking the slide to the fastener-applying arm whereby the rocking movement of the latter is translated to a longitudinal sliding movement of the anvil to aline the fastener-applying means with another set of clinching means thereon.

10. In a device of the type indicated, a base, an anvil mounted to slide on the base and having a plurality of sets of clinching means, a fastener-applying arm pivotally mounted for rocking movement toward and away from the anvil, a slide on the fastener-applying arm, interengaging means on the anvil and slide whereby the rocking movement of the fastener-applying arm toward the anvil is translated to a longitudinal movement of either the anvil or slide, a spring for yieldingly holding the anvil to aline the fastener-applying arm with one set of the clinching means, and selectively operable locking means for connecting the slide to the fastener-applying arm whereby the anvil will be slid with respect to the arm to aline the latter with another set of the clinching means.

11. In a device of the type indicated, a base, an anvil slidable on said base and having a plurality of sets of clinching means, fastener-applying means mounted for movement toward and away from the anvil, a spring for yieldingly holding the anvil in position on the base to aline the fastener-applying means with one of the sets of clinching means, a slide on the fastener-applying means, interengaging means on the slide and anvil, a spring having less resistance than the first-named spring for holding the slide in predetermined position on the fastener-applying means while yielding to permit the slide to move relatively thereof, and means for locking the slide to the fastener-applying means to cause the anvil to be slid on the base to aline the fastener-applying means with another set of clinching means.

12. In a device of the type indicated, a base, an anvil slidable on the base and having a plurality of sets of clinching means, fastener-applying means relatively movable toward and away from said clinching means, selectively operable means on the fastener-applying means for relatively adjusting the anvil and fastener-applying means to aline the latter with a particular set of the clinching means, and means for locking the selectively operable means to aline the fastener-applying means with one set of the clinching means.

13. In a device of the type indicated, an anvil having a plurality of sets of clinching means, fastener-applying means mounted for movement toward and away from the anvil, means for relatively adjusting the anvil and fastener-applying means to aline the latter with any one of the sets of clinching means, a tiltable knob for operating the fastener-applying means and controlling the operation of the last-named means, and means for locking the tiltable knob in any tilted position.

14. In a device of the type indicated, an anvil having a plurality of sets of clinching means, fastener-applying means mounted for movement toward and away from the anvil, said fastener-applying means being adapted to cooperate with one set of the clinching means on the anvil, means for relatively adjusting the anvil and fastener-applying means to aline the latter with another set of the clinching means on the anvil, a knob for operating the fastener-applying means and tiltable to one or the other of two positions for controlling the operation of the last-named means, and means for locking the tiltable knob in either of its two tilted positions.

15. In a device of the type indicated, a base having an opening therein with tongues extending across said opening, fastener-applying means mounted for movement toward and away from the base, an anvil slidably mounted on the base and having a plurality of sets of clinching means, and a stud depending from the anvil into the opening in the base and engageable with the adjacent edges of the opposite tongues to aline the fastener-applying means with one or the other of the sets of clinching means, said tongues being bendable to initially adjust the position of the anvil on the base to aline the clinching means with the fastener-applying means.

16. In a device of the type indicated, fastener-applying means, clinching means having a plurality of sets of clincher-grooves, said fastener-applying means and clinching means cooperating to clinch a driven fastener in one of the sets of clincher-grooves, means operable by the fastener-applying means for relatively adjusting the latter and the anvil to clinch a driven fastener in another set of clincher-grooves, and means on the fastener-applying means for controlling the operation of the last-named means.

17. In a device of the type indicated, a member having a plurality of sets of clincher-grooves arranged in spaced relationship thereon, fastener-applying means mounted for movement relatively of said member for cooperation with any one of the sets of clincher-grooves, means automatically operated by said relative movement to relatively shift the fastener-applying means and member to aline a driven fastener with a particular set of clincher-grooves on the member, and means on the fastener-applying means for controlling the operation of the last-named means.

18. In a device of the type indicated, a member having a plurality of sets of clincher-grooves arranged in spaced relationship thereon, fastener-applying means mounted for movement toward and away from said member, means operated by the movement of the fastener-applying means toward the member to relatively shift the fastener-applying means and member to aline a driven fastener with a particular set of clincher-grooves, and means on the fastener-applying means for selectively controlling the operation of the last-named means to relatively shift the fastener-applying means and member.

JOHN F. CAVANAGH.